April 20, 1954     A. A. LAHTI     2,676,270
RADIOLOGICAL MEASUREMENT APPARATUS
Filed Dec. 10, 1951
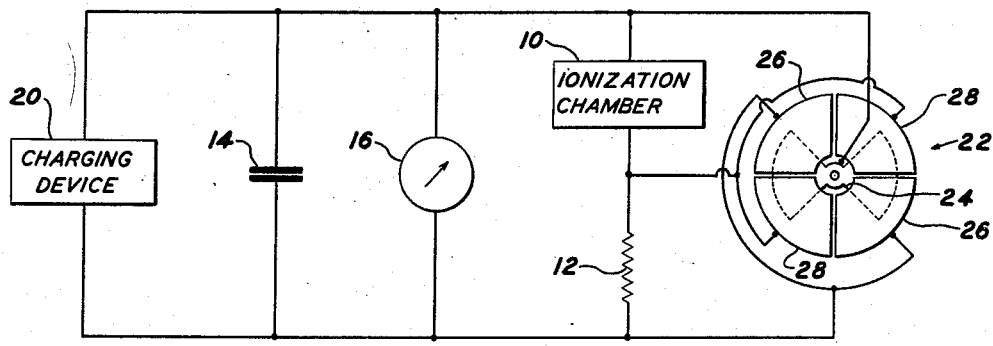
INVENTOR.
ARVO A. LAHTI
BY *James B. Christie*
ATTORNEY Patented Apr. 20, 1954

2,676,270

UNITED STATES PATENT OFFICE 2,676,270

RADIOLOGICAL MEASUREMENT APPARATUS

Arvo A. Lahti, Pasadena, Calif., assignor to Consolidated Engineering Corporation, Pasadena, Calif., a corporation of California Application December 10, 1951, Serial No. 260,818

5 Claims. (Cl. 250—83.6)

This invention relates to improved apparatus for accurately measuring the rate of radioactive radiation over a wide range.

The rate of radioactive radiation is ordinarily measured by measuring the voltage drop caused by the flow of current through a resistor which is connected in series between a source of potential and an ionization chamber. The voltage drop is measured with an electrostatic voltmeter, and when conventional electrostatic voltmeters are employed, the accuracy of the measurement is satisfactory for high level readings but it is poor for low level readings on the voltmeter. In order to increase the range over which accurate measurements can be made, a scale multiplier arrangement could be provided for the voltmeter so that more than one voltage range could be measured; however, such an arrangement would require some type of switching means which would introduce serious insulation problems because leakage currents have a large effect upon the accuracy of the measurements.

In accordance with my invention, the voltage of the source of potential is measured with one meter, and a quadrant type electrostatic voltmeter is employed to measure the voltage drop across the resistor which is connected in series between the source of potential and the ionization chamber. The quadrant type electrostatic voltmeter is connected to the circuit in such manner that it indicates the product of the voltage drop across the resistor and the voltage of the source of potential. Thus, the voltage range of the quadrant type electrostatic voltmeter is determined by the voltage of the source of potential, and the range can be changed merely by changing the magnitude of the voltage of the source of potential. Hence, readings at low levels can be made with approximately the same accuracy as readings at high levels.

The invention is explained with reference to the accompanying drawing which is a schematic diagram of a preferred embodiment of the measurement apparatus.

An ionization chamber 10, a resistor 12 having a large resistance, and a capacitor 14 having a small capacitance are connected in series in a circuit forming a closed loop. An electrostatic voltmeter 16 is connected across the capacitor 14.

The capacitance of the capacitor 14 should be large enough to maintain the voltage across the capacitor substantially constant over a period of at least one minute while the ionization chamber is irradiated at the maximum rate to be measured by the apparatus.

A charging device 20 is connected across the capacitor 14. Various types of charging devices may be employed, but preferably the device is provided with means for discharging the capacitor 14 in increments as well as means for charging it. A suitable charging device is shown in co-pending application Serial No. 244,992 filed on September 4, 1951, by Robinson and Lahti.

A quadrant type electrostatic voltmeter 22 is connected to the circuit so that its rotor 24 and one diametrically opposed set of its quadrants 26 are connected across the capacitor 14 and hence across the serially connected ionization chamber and resistor. The other diametrically opposed set of quadrants 28 of the voltmeter are connected to the junction between the ionization chamber and the resistor.

With the voltmeter 22 connected as shown, the angle of rotation of the rotor 24 is proportional to the product of the voltage drop across the resistor 12 and the voltage across the capacitor 14. Since the voltage drop across the resistor 12 is proportional to the ionization current which flows through the ionization chamber 10, the voltmeter 22 serves to indicate the rate of radioactive radiation to which the ionization chamber is subjected.

If the desired range for the measurements is from 0 to 200 Roentgens per hour, reasonably accurate measurements may be made by employing the voltmeter 22 to measure the radiation rate over two ranges, say from 0 to 200 Roentgens per hour and from 0 to 20 Roentgens per hour. Preferably, two radiation rate scales are provided for the voltmeter 22, with the maximum radiation rate of each scale corresponding to full scale deflection of the voltmeter 22.

In operation, the capacitor 14 is charged by the charging device 20 until the voltmeter 16 indicates one-tenth of a predetermined maximum voltage, say 100 volts for example. The radiation rate is then read on the 0–200 R./hr. scale of the voltmeter 22, and if it is less than 20 R./hr. the charge on the capacitor 14 should be increased by operating the charging device 20 until the voltmeter 22 reads the maximum voltage, say 1000 volts. Then the low level radiation rate can be read with accuracy on the 0–20 R./hr. scale of the voltmeter 22.

If the radiation rate is at a high level, the rate reading should be observed within one minute after the capacitor 14 is charged to the proper voltage so that the change in voltage across the capacitor 14 due to the flow of the ionization current through the ionization chamber will not affect the reading.

If desired, the voltmeter 16 may be employed to indicate the integrated dose of radiation over a period of time. The change in voltage indicated by the voltmeter 16 over the period of time represents the integrated dose of radiation during the period of time. If the voltmeter 16 is employed to measure the integrated dose, it is preferable that it be provided with a suitable scale for the integrated dose measurements in addition to the ordinary voltmeter scale.

Since the range of the radiation rate which is indicated by the voltmeter 22 is determined by the voltage across the capacitor 14, it will be apparent that the voltmeter 22 may be employed to measure any desired number of ranges of the radiation rate, and that it is not limited to the two illustrative ranges described above.

I claim:

1. Radiological measurement apparatus comprising an ionization chamber, a resistor, and a capacitor all connected in series in a circuit forming a closed loop, means for charging the capacitor, means for measuring the voltage across the capacitor, and a quadrant type electrostatic voltmeter having its rotor and one diametrically opposed set of its quadrants connected across the capacitor and having the other diametrically opposed set of its quadrants connected to the junction between the resistor and the ionization chamber.

2. Radiological measurement apparatus comprising an ionization chamber, a resistor and a source of potential all connected in series in a circuit forming a closed loop, means for measuring the voltage of the source of potential, and a quadrant type electrostatic voltmeter having its rotor and one diametrically opposed set of its quadrants connected across the serially connected ionization chamber and resistor and having the other diametrically opposed set of its quadrants connected to the junction between the resistor and the ionization chamber.

3. Radiological measurement apparatus comprising an ionization chamber, a resistor and a voltage source connected in series with the ionization chamber, an electrostatic voltmeter connected across the serially connected ionization chamber and resistor, and a quadrant type electrostatic voltmeter having its rotor and one diametrically opposed set of its quadrants connected across the serially connected ionization chamber and resistor and having the other diametrically opposed set of its quadrants connected to the junction between the resistor and the ionization chamber.

4. Radiological measurement apparatus comprising an ionization chamber, a resistor and a voltage source connected in series with the ionization chamber, and a quadrant type electrostatic voltmeter having its rotor and one diametrically opposed set of its quadrants connected across the serially connected ionization chamber and resistor and having the other diametrically opposed set of its quadrants connected to the junction between the resistor and the ionization chamber.

5. Radiological measurement apparatus comprising an ionization chamber, a resistor and a voltage source connected in series with the ionization chamber, means connected across the serially connected resistor and ionization chamber for providing an electric potential, and a quadrant type electrostatic voltmeter having its rotor and one pair of its quadrants connected across the serially connected ionization chamber and resistor and having the other pair of its quadrants connected to the junction between the resistor and the ionization chamber.

References Cited in the file of this patent

UNITED STATES PATENTS

| Number | Name | Date |
|---|---|---|
| 2,465,938 | Shonka | Mar. 29, 1949 |
| 2,564,626 | MacMahon et al. | Aug. 14, 1951 |

OTHER REFERENCES

Procedures in Experimental Physics, by John Strong, Prentice-Hall, Inc. New York, 1938, pgs. 232 to 236.